United States Patent
Reine et al.

(10) Patent No.: US 6,347,093 B1
(45) Date of Patent: Feb. 12, 2002

(54) APPLICATION PROGRAMMING INTERFACE FOR MODEM AND ISDN PROCESSING

(75) Inventors: Gerald A. Reine, Winchester, MA (US); Leo A. Goyette, Pelham, NH (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/451,216

(22) Filed: Nov. 29, 1999

Related U.S. Application Data

(63) Continuation of application No. 08/893,192, filed on Jul. 15, 1997.
(60) Provisional application No. 60/022,812, filed on Jul. 25, 1996.

(51) Int. Cl.⁷ .................................................. H04J 3/02
(52) U.S. Cl. ...................... 370/463; 370/465; 709/328
(58) Field of Search ................................. 370/420, 421, 370/463, 464, 465, 466, 469, 522, 282, 904; 709/311, 312, 321, 328; 375/222

(56) References Cited

U.S. PATENT DOCUMENTS

| | | | |
|---|---|---|---|
| 4,438,511 A | 3/1984 | Baran | 370/19 |
| 4,445,213 A | 4/1984 | Baugh et al. | 370/94 |
| 4,578,796 A | 3/1986 | Charalambous et al. | 375/8 |
| 4,620,294 A | 10/1986 | Leung et al. | 364/900 |
| 4,679,227 A | 7/1987 | Hughes-Hartogs | 379/98 |
| 4,757,495 A | 7/1988 | Decker et al. | 370/76 |
| 4,884,285 A | 11/1989 | Heynen et al. | 375/25 |
| 4,922,534 A | 5/1990 | Gorniak et al. | 380/49 |
| 4,991,169 A | 2/1991 | Davis et al. | 370/77 |
| RE33,900 E | 4/1992 | Howson | 370/105 |
| 5,276,739 A | 1/1994 | Krokstad et al. | 381/68.2 |
| 5,353,338 A | 10/1994 | Nakano et al. | 379/99 |
| 5,483,530 A | 1/1996 | Davis et al. | 370/465 |
| 5,497,373 A | 3/1996 | Hulen et al. | 370/79 |
| 5,553,063 A | 9/1996 | Dickson | 370/29 |
| 5,574,888 A | 11/1996 | Panditji et al. | 395/500.47 |
| 5,835,089 A | 11/1998 | Skarbo et al. | 709/302 |

Primary Examiner—Ricky Ngo
(74) Attorney, Agent, or Firm—Cesari & McKenna, LLP

(57) ABSTRACT

An application programming interface provides for command and data communication between a user, application or driver and a telephone data processing system which provides communication between a host computer and a telephone line. The telephone data processing system is capable of processing ISDN telephone calls as well as voice or analog-originated telephone calls. The application programming interface of the invention includes a host interface, an ISDN interface and a modem interface. The host interface receives commands and data from the user. The modem interface and ISDN interface provide commands and data communication between the host interface and the appropriate telephone call processing based on telephone call type. At the top level, the specific call type processing is transparent to the user. That is, the user need not know the type of telephone call, i.e., modem or ISDN, being processed.

5 Claims, 2 Drawing Sheets

APPLICATION PROGRAMMING INTERFACE FOR MODEM AND ISDN PROCESSING

RELATED APPLICATIONS

This application is a continuation of U.S. patent application Ser. No. 08/893,192, which was filed on Jul. 15, 1997, by Reine et al. for an Application Programming Interface for Modem and ISDN Processing and based on U.S. Provisional Patent Application Ser. No. 60/022,812, filed Jul. 25, 1996, the disclosure of which is incorporated herein in its entirety by reference.

BACKGROUND OF THE INVENTION

Communication among computers is typically implemented over telephone lines. In analog or "voice" communication, a modem provides the interface between the telephone line and a host computer to convert telephone line signals to computer signals and computer signals to telephone signals. Modern telephone communications are also implemented in digital format. In one digital configuration, analog or voice originated data is digitized and transmitted in digital format over the telephone line. A digital modem can receive the digitized data and covert it to computer readable data. Alternatively, digital data transmitted over telephone lines in ISDN format is received by an ISDN terminal adapter which provides the interface between the digital telephone line and the host computer.

In any of these configurations, an interface must be provided between the host computer and the telephone processing equipment, i.e., the modem or terminal adapter. The interface, in both hardware and software, provides for command and data communication between the user and the modem or terminal adapter. The interface also allows an application or driver running on the host computer to interface with the modem or terminal adapter. The interface, commonly referred to an "application programming interface" or "API," transmits and receives commands and data to and from the modem or terminal adapter to implement computer/telephony communication.

Typically, the software application programming interface (API) runs on the host computer. It defines and maintains command and data structures required for communication between the host driver and the modem or terminal adapter. A conventional API is specific to the communication mode implemented on the applicable telephone line. That is, where ISDN communication is being provided, the API running on the host computer is specific to an ISDN terminal adapter. Where analog or voice is used, the API is specific to modem operation. Thus, traditionally, the host computer is interfaced to a single form of telephone line communication and runs an API applicable to only that single communication mode. If multiple communication modes are to be used, in a traditional configuration, the host computer must run an API for each mode.

SUMMARY OF THE INVENTION

The present invention is directed to an application programming interface. The API of the invention provides an interface between a host application, driver or user and telephone processing-equipment that is capable of processing ISDN telephone calls and analog or voice-originated calls. The API of the invention includes a host interface which transfers signals between the host computer driver or user and the telephone processing system. The API also includes a modem interface which transfers signals to and from the host interface and which transfers commands and data associated with analog or voice-originated telephone calls between the host interface and a modem processor within the telephone data processing system, the modem processor processing data associated with analog or voice-originated telephone calls. The API of the invention also includes an ISDN interface which transfers signals to and from the host interface and which transfers commands and data associated with ISDN telephone calls between the host interface and an ISDN processor in the telephone data processing system, the ISDN processor processing data associated with ISDN telephone calls.

The API of the invention can be used with a telephone processing system that is capable of processing data for both ISDN and analog-originated telephone calls. It can also process data for multiple simultaneous telephone calls of either type or of both types. Such a telephone data processing system is described in U.S. Pat. No. 5,949,762 which is entitled "Apparatus and Method For Processing Multiple Telephone Calls," issued from an application that was co-pending with the present application's parent, and assigned to the same assignee as the present application. The contents of that patent are incorporated herein in their entirety by reference.

Despite the ability of the API of the invention to facilitate plural telephone call types, the specific type of call being processed is transparent to the user or driver. That is, the user can implement interface processing without knowing the type of call being processed. To this end, in the API of the invention, the host API is at the user level and accepts commands and data from the user. The API of the invention also includes two lower-level APIs, namely, a modem API and an ISDN API, which are implemented based upon the type of call being processed.

The modem API is implemented when voice or analog originated calls are processed. In this case, the host API processes and formats commands and data from the host or driver for modem processing. The modem API receives the modem commands and data from the host API and generates modem commands and data and forwards them to the modem processor in the telephone data processing system.

The ISDN API is implemented when ISDN calls are processed. For ISDN calls, the host API processes and formats commands and data entered by the host for ISDN processing. The command and data are received from the host API. In response, the ISDN API generates ISDN commands and data and forwards them to an ISDN processor in the telephone data processing system for ISDN processing.

The API of the invention provides numerous advantages over interfaces provided in conventional computer/telephone interface systems. The API of the invention provides the user with the flexibility of processing different types of telephone calls while not requiring the user to know which type of call is being processed. In other conventional systems, the API is specifically dedicated to a particular type of telephone call and, therefore, can only provide the user access to that type of call. The API of the invention provides the user with the ability to process different types of telephone calls, while maintaining transparency to the user, such that the user need not know the type of call being processed.

The API of the invention allows the user to process multiple telephone calls simultaneously, such calls being received in multiple channels of a basic rate ISDN (BRI) or a primary rate ISDN (PRI) telephone line. The ability to process multiple simultaneous telephone calls of multiple call types makes the API of the invention applicable to systems which regularly process multiple telephone calls simultaneously. Such systems could include Internet service providers. In conventional systems, both the hardware and the associated software interface had to be provided for each individual line. The system of the invention is therefore far less hardware and software intensive and, therefore, more efficient and less costly than conventional systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF AN ILLUSTRATIVE EMBODIMENT

Figure 1:
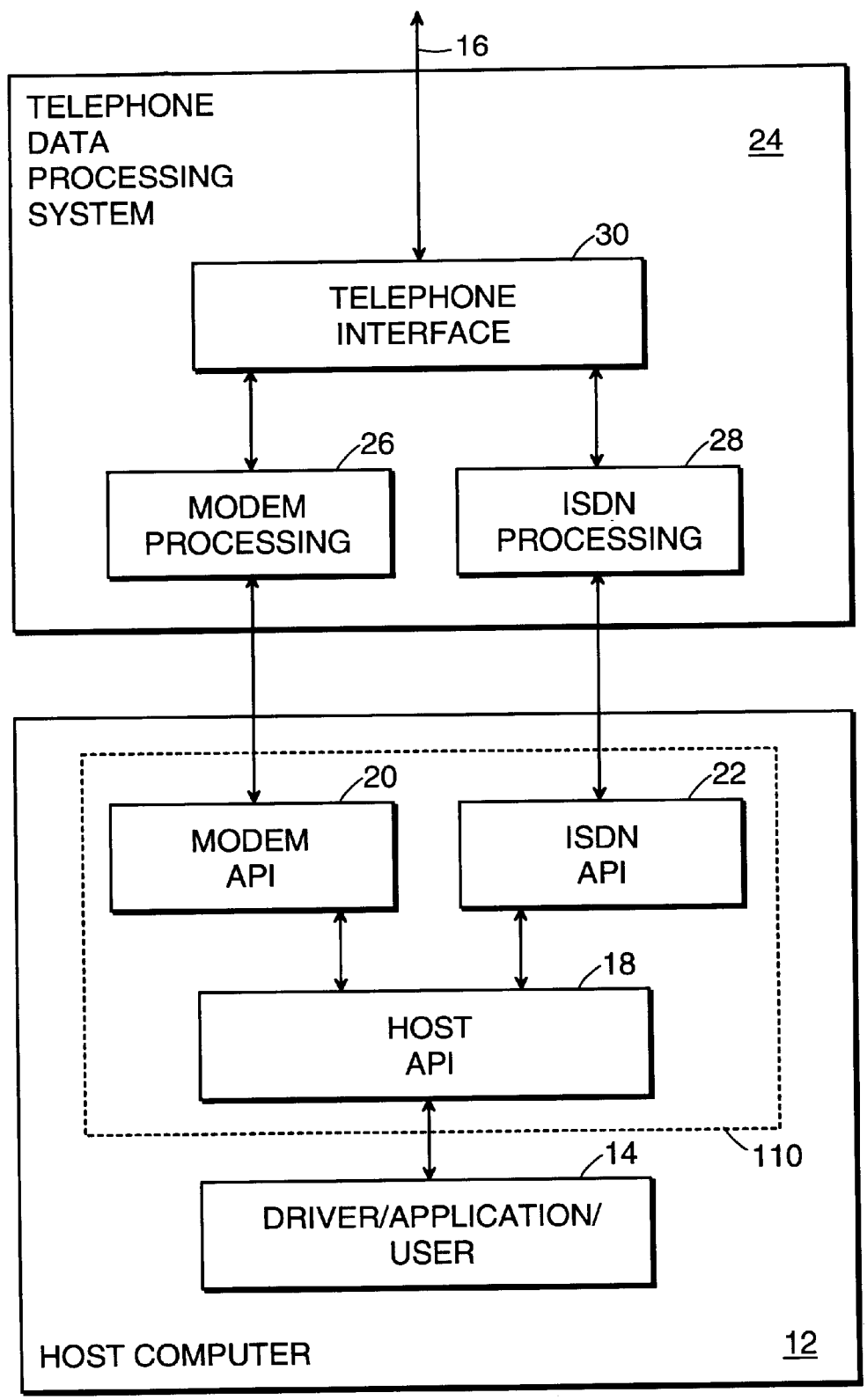
FIG. 1 is a schematic functional block diagram which illustrates the application programming interface of the invention.

FIG. 1 is a schematic functional block diagram that shows one embodiment of the application programming interface 110 of the invention. As shown in the figure, the API 110 of the invention is resident on a host computer 12. The API 110 interfaces with a driver or application or a user 14 which transmits commands and data to the API 110 to control the communication between the host computer 12 and telephone line 16.

In this embodiment, the API 110 includes a user-level host API 18, a lower-level modem API 20 and a lower-level ISDN API 22. The driver 14 interfaces with the API 110 via the host API 18. Depending upon the type of telephone call being processed, the host API 18 in turn interfaces with either the modem API 20 and/or the ISDN API 22. The commands issued by the driver 14 are independent of the type of telephone call. The API 18 identifies the call type and formats and forwards the appropriate commands and data to the modem API 20 and/or ISDN API 22. The driver need not be aware of the type of telephone call being processed and, therefore, need not select commands and data based on call type. That distinction is made by the host API 18.

In the embodiment depicted in FIG. 1, the API 110 of the invention interfaces with a telephone data processing system 24. The processing system 24 is capable of performing both modem processing 26 on analog or voice originated calls as well as ISDN processing 28 on ISDN type telephone calls. The telephone data processing system 24 can be of the type described as the MICA™ unit in the copending U.S. patent application Ser. No. 08/686,990, entitled "Apparatus and Method for Processing Multiple Telephone Calls," incorporated herein by reference.

The MICA™ unit described in that co-pending application includes a PRI interface board for performing ISDN processing 28 as well as a multiple-modem and port processor board used for modem processing 26. The multiple modem board, in one embodiment, includes five "hex modules," each of which is capable of processing six modem telephone calls simultaneously. Hence, the multiple-modem board can process up to thirty simultaneous telephone calls.

The telephone data processing system 24 also includes a telephone interface 30 which is connected to the telephone line 16. Data from modem processing 26 and/or ISDN processing 28 are formatted by the telephone interface 30 for transmission over the telephone line 16. When receiving from the telephone line, the telephone interface 30 receives incoming telephone data and formats it according to the telephone call type and forwards it to the appropriate processing 26 or 28.

Figure 2:
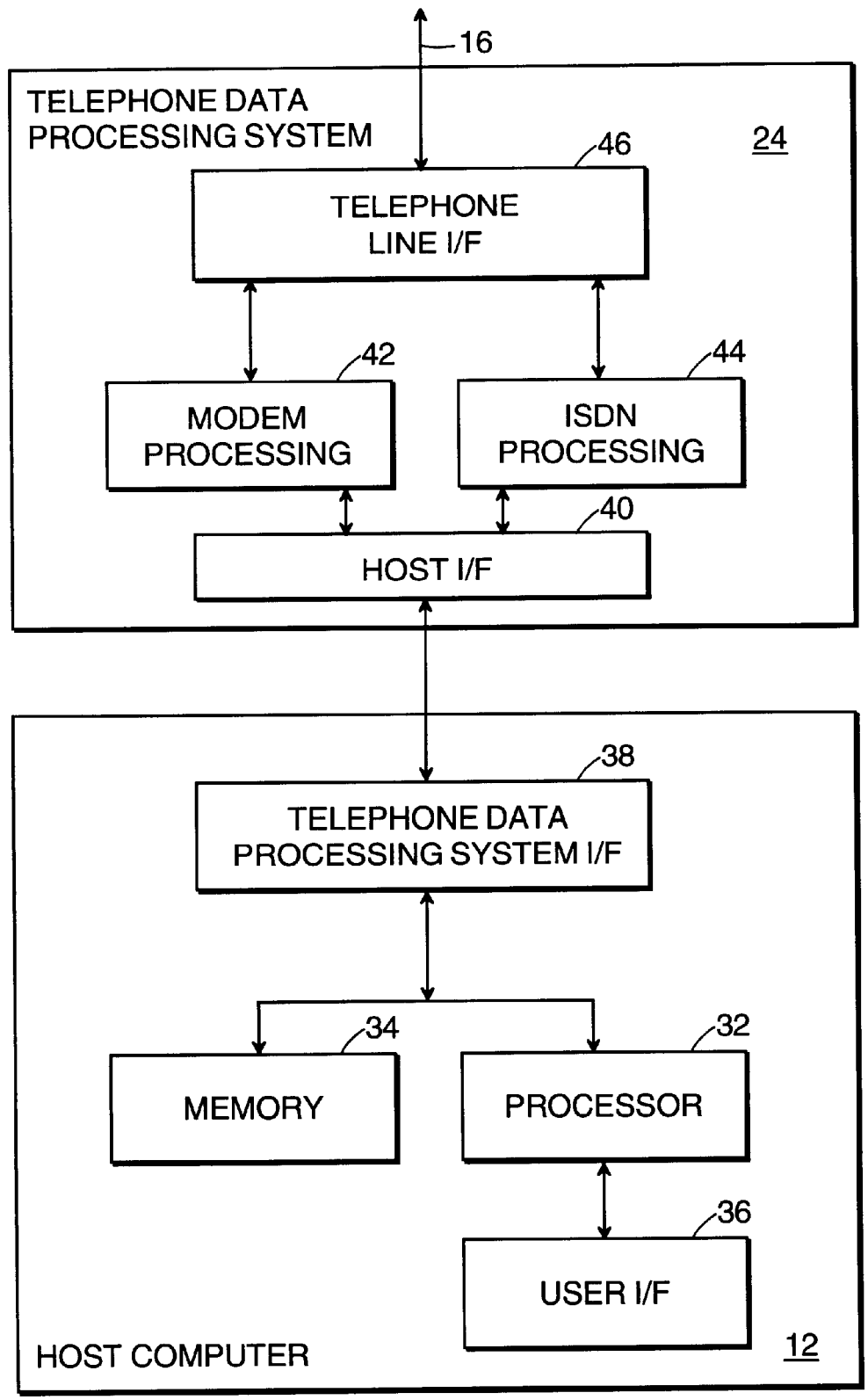
FIG. 2 is a schematic hardware block diagram which illustrates the application programming interface of the invention.

FIG. 2 is a schematic hardware block diagram which shows one embodiment of the API 110 (FIG. 1) of the invention. As described above in connection with FIG. 1, the API 110 is implemented on the host computer 12. The computer 12 can be any computer that includes a processor 32 coupled to a memory 34. In normal fashion, the processor 32 accesses data and instructions stored in memory 34 to execute the interface function of the present invention. The computer 12 can also include the user, interface 36 for providing input/output from/to the user, application or driver to control communication between the host computer 12 and telephone line 16. The computer 12 also includes an interface 38 which provides for communication between the host computer 12 and the telephone data processing system 24. The host interface 40 in the processing system 24 also facilitates that communication.

As described above, the telephone data processing 24 is capable of processing analog or voice-originated calls via modem processor 42 as well as ISDN calls via ISDN processor 44. A telephone interface 46 provides the hardware and software interface between the telephone line 16 and the modem 42 and ISDN 44 processors. As described above, the telephone data processing system 24 can be of the form of the MICA unit described in U.S. co-pending patent application Ser. No. 08/686,990.

As described in that co-pending application, MICA is an acronym for Modem-ISDN Channel Aggregation and is used to identify the capability of the system to process both modem and ISDN data. The system includes a card set which includes a commercially available PRI interface card (ISDN processor 44) and a proprietary multiple-modem processing card (modem processor 42). The MICA card set is typically produced for use in ISA bus personal computers. The PC host software is responsible for command and data flow between the host-based driver and the MICA card set. The host software provides the interface 110 of the present invention.

The API 110 of the invention provides the software interface between the host computer operating system drivers and the modem 42 and ISDN 44 processors which, in one embodiment, are the MICA board set. This is done by providing an application programming library of function calls independent of operating system which provide command and data transfer and status reporting capabilities to the host application. As shown in FIG. 1, the host API 18 interfaces to both the modem API 20 and the ISDN API 22 and presents a single interface to the user. This layering enables the API 110 of the invention to present a consistent interface to a device driver even if the underlying board(s) should change.

The MICA board set is accessed via a shared memory interface. This interface allows the host software to address the boards' memory as though it was addressing host memory. The board memory is accessed through a window of a fixed size in a host memory space. While the host window does not move, the base address of the window can. This is accomplished by changing the addresses in the boards' page register. Each page of the boards' memory is the size of the host's memory window. In this way, the MICA boards' entire memory range can be accessed while using a small portion of the host memory space.

The host API 18 includes of a number of operating system-independent function calls to be made by an operating-system-specific driver. The OS driver uses this API 18 to manipulate the modem processor 42 and the ISDN processor 44, which, in one embodiment, comprise the MICA board set. The host API library provides an interface between the device driver 14 and lower-level board specific function calls in the modem API 20 and ISDN API 22. Table 1 contains a list of these host API function calls.

FIG. 1 is a schematic functional block diagram that shows one embodiment of the application programming interface 110 of the invention. As shown in the figure, the API 110 of the invention is resident on a host computer 12. The API 110 interfaces with a driver or application or a user 14 which transmits commands and data to the API 110 to control the communication between the host computer 12 and telephone line 16.

In this embodiment, the API 110 includes a user-level host API 18, a lower-level modem API 20 and a lower-level ISDN API 22. The driver 14 interfaces with the API 110 via the host API 18. Depending upon the type of telephone call being processed, the host API 18 in turn interfaces with either the modem API 20 and/or the ISDN API 22. The commands issued by the driver 14 are independent of the type of telephone call. The API 18 identifies the call type and formats and forwards the appropriate commands and data to the modem API 20 and/or ISDN API 22. The driver need not be aware of the type of telephone call being processed and, therefore, need not select commands and data based on call type. That distinction is made by the host API 18.

In the embodiment depicted in FIG. 1, the API 110 of the invention interfaces with a telephone data processing system 24. The processing system 24 is capable of performing both modem processing 26 on analog or voice originated calls as well as ISDN processing 28 on ISDN type telephone calls. The telephone data processing system 24 can be of the type described as the MICA™ unit in the copending U.S. patent application Ser. No. 08/686,990, entitled "Apparatus and Method for Processing Multiple Telephone Calls," incorporated herein by reference.

The MICA™ unit described in that co-pending application includes a PRI interface board for performing ISDN processing 28 as well as a multiple-modem and port processor board used for modem processing 26. The multiple modem board, in one embodiment, includes five "hex modules," each of which is capable of processing six modem telephone calls simultaneously. Hence, the multiple-modem board can process up to thirty simultaneous telephone calls.

The telephone data processing system 24 also includes a telephone interface 30 which is connected to the telephone line 16. Data from modem processing 26 and/or ISDN processing 28 are formatted by the telephone interface 30 for transmission over the telephone line 16. When receiving from the telephone line, the telephone interface 30 receives incoming telephone data and formats it according to the telephone call type and forwards it to the appropriate processing 26 or 28.

FIG. 2 is a schematic hardware block diagram which shows one embodiment of the API 110 (FIG. 1) of the invention. As described above in connection with FIG. 1, the API 110 is implemented on the host computer 12. The computer 12 can be any computer that includes a processor 32 coupled to a memory 34. In normal fashion, the processor 32 accesses data and instructions stored in memory 34 to execute the interface function of the present invention. The computer 12 can also include the user, interface 36 for providing input/output from/to the user, application or driver to control communication between the host computer 12 and telephone line 16. The computer 12 also includes an interface 38 which provides for communication between the host computer 12 and the telephone data processing system 24. The host interface 40 in the processing system 24 also facilitates that communication.

As described above, the telephone data processing 24 is capable of processing analog or voice-originated calls via modem processor 42 as well as ISDN calls via ISDN processor 44. A telephone interface 46 provides the hardware and software interface between the telephone line 16 and the modem 42 and ISDN 44 processors. As described above, the telephone data processing system 24 can be of the form of the MICA unit described in U.S. co-pending patent application Ser. No. 08/686,990.

As described in that co-pending application, MICA is an acronym for Modem-ISDN Channel Aggregation and is used to identify the capability of the system to process both modem and ISDN data. The system includes a card set which includes a commercially available PRI interface card (ISDN processor 44) and a proprietary multiple-modem processing card (modem processor 42). The MICA card set is typically produced for use in ISA bus personal computers. The PC host software is responsible for command and data flow between the host-based driver and the MICA card set. The host software provides the interface 110 of the present invention.

The API 110 of the invention provides the software interface between the host computer operating system drivers and the modem 42 and ISDN 44 processors which, in one embodiment, are the MICA board set. This is done by providing an application programming library of function calls independent of operating system which provide command and data transfer and status reporting capabilities to the host application. As shown in FIG. 1, the host API 18 interfaces to both the modem API 20 and the ISDN API 22 and presents a single interface to the user. This layering enables the API 110 of the invention to present a consistent interface to a device driver even if the underlying board(s) should change.

The MICA board set is accessed via a shared memory interface. This interface allows the host software to address the boards' memory as though it was addressing host memory. The board memory is accessed through a window of a fixed size in a host memory space. While the host window does not move, the base address of the window can. This is accomplished by changing the addresses in the boards' page register. Each page of the boards' memory is the size of the host's memory window. In this way, the MICA boards' entire memory range can be accessed while using a small portion of the host memory space.

The host API 18 includes of a number of operating system-independent function calls to be made by an operating-system-specific driver. The OS driver uses this API 18 to manipulate the modem processor 42 and the ISDN processor 44, which, in one embodiment, comprise the MICA board set. The host API library provides an interface between the device driver 14 and lower-level board specific function calls in the modem API 20 and ISDN API 22. Table 1 contains a list of these host API function calls.

TABLE 1

Host API Function Call Summary

| Call Type | Function | Purpose |
|---|---|---|
| Initialization | MICA_Accept ( ) | Accept an incoming call. |
| | MICA_Close ( ) | Close a data channel; used for terminating a call. |
| | MICA_Connect ( ) | Dial the phone |
| | MICA_Init ( ) | Initialize the boards; should be called once per board. |
| | MICA_Listen ( ) | Listen on a channel for an incoming call. |
| | MICA_Open ( ) | Open a channel for listening or dialing. |
| | MICA_Reset ( ) | Reset a board; used when a board needs to be restarted. |
| Data Flow | MICA_Recv ( ) | Receives data (if any) from a previously opened channel. |
| | MICA_Select ( ) | Check a channel's status. |
| | MICA_Send ( ) | The channel must be opened first; sends data out to the MICA board set. |
| Control Messages | MICA_GetOption ( ) | Get the status of a system option. |
| | MICA_ProcessInt ( ) | Process a MICA interrupt. |
| | MICA_SetOption ( ) | Set or modify a system option. |

All of the host API function calls send parameters with each function call. Each function also returns a result code to indicate the result of the function call. Each function call will now be described in detail.

The MICA_Accept call is used to accept an incoming call on a particular channel. A sample format for the call is as follows:

```
MICA_Accept (
    int16   channelId
)
```

The parameter channelId indicates the ID number of the channel on which the call is to be accepted. The possible result codes are as follows:

| MICA_SUCCESS | The call is accepted. |
|---|---|
| MICA_ERROR | The call is rejected. |

The MICA_Close function call is used to close a data channel. A sample format is as follows:

```
MICA_Close (
    int16   channelId
)
```

The parameter channelId is used to identify the channel that is to be closed. The possible result codes are as follows:

| MICA_SUCCESS | The channel is closed. |
|---|---|
| MICA_INVALID_CHANNEL | The channel provided was not valid. |
| MICA_NOT_OPEN | The channel was not open. |
| MICA_ERROR | Either the ISDN or the modem board didn't close. |

The MICA_Connect function call is used to open a data channel to initiate an outgoing telephone call. A sample format for the call as follows:

```
MICA_Connect (
    int16   channel Id,
    char    *phoneNumber,
    void    (*callBack)(channelId, event_mask)
)
```

If the optional callBack routine is provided, it is executed after the connection is made. The channelId is returned with the callBack routine allowing a use of a single callBack routine with many channels. The event_mask reflects the state of the channel after the connection is made. The parameter channelId identifies the channel to be dialed. If the callBack routine is used, the channelId is provided. The parameter phoneNumber is a pointer to the phone number to be dialed. The number is in ASCII text format. The callBack parameter identifies the callback routine, and the parameter event_mask identifies the status of the channel after the connection is completed. It should be noted that prior to calling the MICA Connect function, the application must call MICA_Open. The possible result codes returned after the MICA_Connect call are as follows:

| MICA_CHANNEL_NOT_OPEN | The channel was not opened. |
|---|---|
| MICA_CONNECT_NO_CHANNELS | There are no available channels. |
| MICA_ERROR | General Error message. |
| MICA_INVALID_CALL_TYPE | The call type was invalid. |
| MICA_SUCCESS | Connecting. |
| MICA_INVALID_CHANNEL | The channelId provided was invalid. |

The MICA_GetOption function call is used to get status and other information from the board set. A sample format for the MICA_GetOption call is as follows:

```
MICA_GetOption (
    int16   channelId,
    int16   *micaCommand,
    char    *returnData
)
```

The requested data is written into the returnData buffer. Note that this buffer should be large enough to hold the maximum size return message. The parameter board_set identifies the MICA board set on which the operation is to be performed. The micaCommand parameter identifies the command, and the returnData parameter indicates the returned data value. The possible result codes are as follows:

| | |
|---|---|
| MICA_INVALID_COMMAND | The specified command was not recognized. |
| MICA_SUCCESS | The command completed successfully. |
| MICA_ERROR | The command failed to complete. |

The MICA_Init function call is used to initialize the telephone data processing system 24. For one embodiment, a sample format for the call is as follows:

```
MICA_Init (
    mica_status_str    *micaStr,
    char               *buffer,
    int16              buffer_len,
    int16              channels,
    int16              channelIds
)
```

The micaStr parameter identifies the MICA status structure. The buffer parameter identifies memory allocated for MICA structures. The buffer_len parameter identifies the size of the buffer in bytes. The channels parameters identifies the number physical channels, and the channelIds parameter identifies the number of virtual channels. The possible result codes are as follows:

| | |
|---|---|
| MICA_INIT_INSUFFICIENT_DATA | Not enough information was provided. |
| MICA_INIT_INSUFFICIENT_BUFFER | The buffer provided was too small. |
| MICA_ERROR | The command failed to complete. |
| MICA_SUCCESS | The command completed successfully. |

Note:
the calling application is responsible for allocating sufficient space for the MICA Status structure (for example malloc (size of (mica_status_str))). The MICA API assumes sufficient space has been allocated.

Note: the calling application is responsible for allocating sufficient space for the MICA Status structure (for example malloc (size of (mica_status_str))). The MICA API assumes sufficient space has been allocated.

The MICA_Listen function call is used to open a data channel to receive an incoming call. An example of its format is as follows:

```
MICA_Listen (
    int16    channelId,
    char     *phoneNumber,
    void     (*callBack)(channelId, event mask)
)
```

The channelId parameter indicates the assigned channel. When used in the callBack routine, the channelId represents the channel on which the called was received. The phoneNumber parameter indicates the number to listen for; the callBack parameter indicates the routine that is to be executed when the call arrives and the parameter event_mask indicates the state of the channel after the call is accepted. Possible result codes are as follows:

| | |
|---|---|
| MICA_SUCCESS | The channel was opened successfully. |
| MICA_CHAN_INVALID | The channel parameter was invalid. |

The MICA_Open function call is used to open a data channel. A sample format for the call is as follows:

```
MICA_Open (
    int16    callType,
    int16    direction,
    int16    assignResource,
    int16    *error
)
```

The callType parameter indicates the type of call being requested, i.e., ISDN or modem. The direction parameter indicates whether the call is an inbound or outbound call. The assignResource parameter allocates the modem or ISDN channel to the identified MICA channel. This parameter is typically assigned a Boolean true/false variable. The error parameter is a pointer to a variable for error reporting. This avoids confusion between a valid channel ID and an error value. The optional callType and direction parameters are of particular use when some channels are restricted to outbound or inbound calls only. The assignResource parameter is useful when over-subscription of the channels is allowed. If the call is successful, a channelId is returned. If an error occurred, MICA_ERROR is returned. The error type is identified in the error byte. The possible values for error are:

| | |
|---|---|
| MICA_OPEN_INVALID_TYPE | The callType is invalid. |
| MICA_OPEN_INVALID_DIRECTION | The direction was invalid. |
| MICA_OPEN_NO_CHANNELS | No idle channels. |

The MICA_ProcessInt function call is used to process an interrupt. Once an interrupt service routine or polling routine has detected that a board needs service, this routine is used to service the board. A format for the call is as follows:

```
MICA_ProcessInt(
    int16    intType,
    int16    callType
)
```

The intType parameter indicates the type of interrupt received, i.e., data or control. The callType parameter indicates the call type, i.e., ISDN or modem. The possible result codes are as follows:

| | |
|---|---|
| MICA_SUCCESS | The board(s) were successfully serviced. |
| MICA_ERROR | An error occurred while servicing the boards(s). |

The MICA_Recv function call is used to hand a data buffer to receive data for a specific channel. A format for the call is as follows:

```
MICA_Recv (
    int16     channelId,
    char      *dataBuffer,
    int16     bufferSize
)
```

The channelId parameter indicates the channel from which data is received. The dataBuffer parameter indicates the buffer in which the data is placed, and the bufferSize parameter indicates the number of bytes that can be written into the buffer. The bufferSize parameter is normally the maximum number of bytes that can be inserted into the data buffer. The return result is typically the number of bytes actually written into the data buffer. If an error occurred while data is being copied into the buffer, an error bit, typically −1, is returned. The MICA_Reset function call is used to reset the MICA board set(s). A format for the call is as follows:

```
MICA_Reset(
    int16     board_to_reset
)
```

The parameter board_to_reset indicates which board is to be reset, since more than one MICA board set can be used in the system. After this function is called, the MICA board set must be reinitialized by calling MICA_Init before any other calls can be made. The typical result codes returned after a MICA Reset call are as follows:

| | |
|---|---|
| MICA_SUCESS | The board set was successfully reset. |
| MICA_ERROR | An error occurred while resetting the board(s). |
| MICA_INVALID_NUMBER | board_to_reset was set to an invalid number. |

The MICA_Select function call is used to obtain channel status information such as the connection state of a particular channel. A format for the call is as follows:

```
MICA_Select (
    int16     channelId,
    int16     statusMask
)
```

The parameter channelId identifies the channel, and statusMask is a data word which masks off unwanted information. If the statusMask is set to zero, the space available in the transmit buffer is returned in response to the function call. The returned value is either the channel status, the space available in the transmit buffer or MICA_ERROR. If the most significant bit of the returned value is set, the returned value is MICA_ERROR, not the channel status.

The MICA_Send function call is used to hand a data buffer to a specific channel. A format the MICA_Send call is as follows:

```
MICA_Send (
    int16     channelId,
    char      *dataBuffer,
    int16     bytes
)
```

The channelId parameter identifies the channel from which data is received; the dataBuffer parameter identifies the buffer into which the data is placed; and the bytes parameter indicates the total number of bytes to be transmitted. It should be noted that data cannot be transmitted until a channel has entered the active state. Successfully connecting to a destination or accepting an incoming call causes the channel to transition to the active state. The channel's status may be verified by using the MICA Select call. The result of the MICA Send call is the number of bytes actually transmitted. If an error occurs during transmit, MICA_ERROR(-I) is returned.

The MICA_SetOption call is used to send various command and control messages to the MICA telephone data processing system 24. A list of the commands that can be sent is contained in Tables 2 and 3. Table 2 lists modem mode commands, and Table 3 lists ISDN mode commands.

TABLE 2

Set Channel Option Modem Commands

| Command | Value(s) | Description |
|---|---|---|
| MICA MODEM_MODE | Originate/Answer | Set the modem to Originate or Answer mode |
| MICA_MODEM_CALL_TONE | Send | Determines whether the modem should send calling tone or not. |
| MICA_MODEM_GUARD_TONE | Use Tone | Should the modem use guard tone for V 22N 22bis. |
| MICA_MODEM_FORMAT | Async, LAPM, MNP, ARA | Set the modem's data transmission format negotiation parameters. |
| MICA_MODEM_AUTOD | Autodetect | Automatically detect the peer's protocol. |

TABLE 2-continued

Set Channel Option Modem Commands

| Command | Value(s) | Description |
| --- | --- | --- |
| MICA_MODEM_AUTOD_TO | 0–25.5 s | Autodetect time-out period. |
| MICA_MODEM_BREAK_MODE | Expedited, Destructive | Sets the break processing method for the modem. |
| MICA_MODEM_BUFF_LEN | 0–64 | Protocol buffer length. |
| MICA_MODEM_NEGOT_TO | 0–25.5 s | Timeout for Protocol Negotiation. |
| MICA_MODEM_NEGOT_FALL_B | ASCII Value | The character causing negotiation fallback. |
| MICA_MODEM_COMPRESSION | None, V.42bis, MNP5 | Compression method used by the modem. |
| CA_MODEM_MODEM_VXX | V.34bis, V.32bis, V.22bis | The modem standard to use. |
| MICA_MODEM_MAX_CONN_RATE | 1–14 | 2400 * the number specified. |
| MICA_MODEM_MIN_CONN_RATE | 1–14 | 2400 * the number specified. |
| MICA_MODEM_SIG_QUAL_LEVEL | 1–5 | The line signal quality threshold. |
| MICA_MODEM_TX_LEVEL | 0–15 dbm | The transmit level. |
| MICA_MODEM_IDLE_TO | 1–255 s | Idle line timeout. |
| MICA_MODEM_FRAME_RETX | 0–255 s | Frame retrans-missionlimit. |
| MICA_MODEM_NO_DCD_HANGUP | 0–25.5 s | Lost carrier hang-up delay. |
| MICA_MODEM_RETRAIN_DISC | 1–255 s | Consecutive retrain disconnects. |
| MICA_MODEM_FALL_FWD_TIMER | 1–255 s | 0 Disconnects. |
| MICA_MODEM_RDL_RESPONSE | Enable | Remote Diagnostic Loopback response. |
| MICA_MODEM_COUNTRY_CODE | 0–255 | Country Location. |
| MICA_MODEM_MIN_ANSWER_BACK | 0–255 ms | Answer back time. |
| MICA_MODEM_CALL_TONE_GAIN | 0–15 dbm | Call Tone Gain. |
| MICA_MODEM_V.34_INFO | | Information bits for V.34. |

TABLE 3

Set Channel Option ISDN Commands

| Command | Value(s) | Description |
| --- | --- | --- |
| MICA_ISDN_ADD_BONDING | 1–29 | Adds an additional Bonding channel. |
| MICA_ISDN_B_CHANNEL | 1–29 | Requests a specific B channel. |
| MICA_ISDN_CALL_TYPE | Voice, Modem, 56K, 64K | Describes the call type. |
| MICA_ISDN_CALLED_PARTY | Number | Sets the Called Party Number for identification of incoming calls and the number dialed for outgoing calls. |
| MICA_ISDN_CALLING_PARTY | Number | Sets the Calling Party Number for identification of incoming calls. |
| MICA_ISDN_REDIRECT | Number | Redirect the call. |

What is claimed is:

1. A storage medium containing instructions readable by a computer to configure the computer to provide an application programming interface for providing an interface between a host computer driver and a telephone data processing system, said telephone data processing system being capable of processing analog type telephone calls and ISDN telephone calls, said application programming interface comprising:

a host interface that transfers signals to and from the host computer driver;

a modem interface that transfers signals to and from the host interface and which transfers commands and data associated with analog type telephone calls to and from a modem processor in the telephone data processing system, the modem processor processing analog type telephone calls; and an ISDN interface that transfers signals to and from the host interface and which transfers commands and data associated with ISDN telephone calls to and from an ISDN processor in the telephone data processing system, the ISDN processor processing ISDN telephone calls.

2. The storage medium of claim 1 wherein the modem interface transfers commands and data to and from the modem processor to process multiple simultaneous analog type telephone calls.

3. The storage medium of claim 1 wherein the ISDN interface transfers commands and data to and from the ISDN processor to process multiple simultaneous ISDN telephone calls.

4. The storage medium of claim 1 wherein the host interface transfers signals to and from the host driver to process multiple analog type and ISDN telephone calls.

5. The storage medium of claim 1 wherein the signals transferred to and from the host computer driver are independent of a call type of a telephone call being processed.

* * * * *